Oct. 6, 1959  G. W. COPE  2,907,475
TRANSITION COUPLING
Filed Sept. 23, 1957

Inventor:
Geoffrey W. Cope
By Wilmer Mechlin
his Attorney

United States Patent Office 2,907,475
Patented Oct. 6, 1959

2,907,475

TRANSITION COUPLING

Geoffrey W. Cope, Williamsville, N.Y., assignor to Symington Wayne Corporation, a corporation of Maryland Application September 23, 1957, Serial No. 685,676

7 Claims. (Cl. 213—112)

This invention relates to coupling devices for railway cars and particularly to a transition coupling for connecting an automatic knuckle type coupler to a draw hook of a screw coupling.

The primary object of the present invention is to provide a transition coupling whereby an automatic knuckle type coupler and draw hook are flexibly connected and the connection in buff is forced to flex downwardly to prevent its disengagement from the draw hook.

Another object of the invention is to provide a transition coupling whereby an automatic knuckle type coupler and draw hook are connected for relative universal movement, the connection including a vertically pivotable linkage carrying means engageable with the draw hook under buffing forces for causing the linkage to fold upwardly under buffing forces and prevent its accidental disengagement from the draw hook.

An additional object of the invention is to provide a transition coupling removably attachable at one end to a knuckle of an automatic coupler and droppable at one end over a draw hook which readily may be applied to and removed from the knuckle and which requires no modification of and incorporates means for preventing its accidental disengagement from the draw hook.

A further object of the invention is to provide a transition coupling which is simple and rugged in construction, efficient in operation and easily applied and removed with such minor modification of the knuckle of the automatic coupler as not to interfere with normal operation of the coupler with the transition coupling removed.

Figure 1:
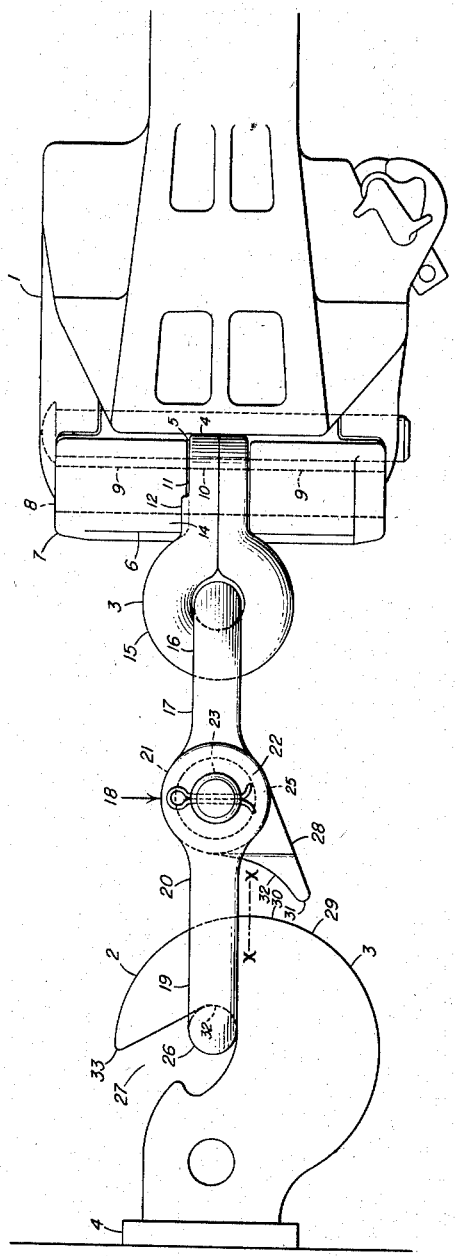
Figure 2:
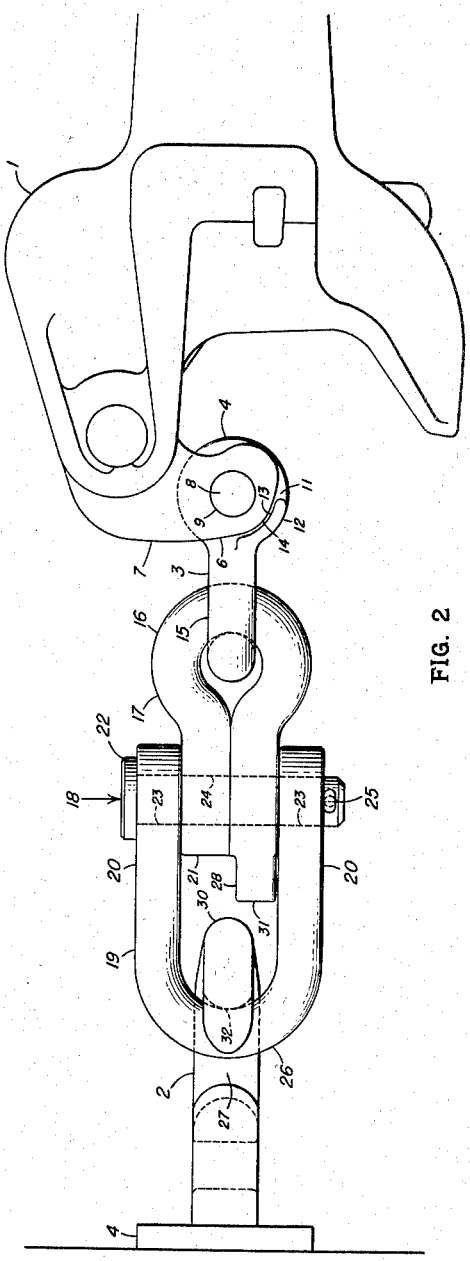

Other objects and advantages of the invention will appear hereinafter in the detailed description, be particularly pointed out in the appended claims and be illustrated in the accompanying drawings, in which:

Figure 1 is a side elevational view of an automatic knuckle type coupler and draw hook connected by a preferred embodiment of the transition coupling of the present invention; and Figure 2 is a plan view of the structure of Figure 1.

Referring now in detail to the drawings, in which like reference characters designate like parts, the transition coupling of this invention is adapted to be applied to connect any automatic knuckle-type coupler to a draw hook and will find its main use on a railroad in process of changing over from screw-type to automatic couplings.

Designed to connect an automatic knuckle type coupler 1 to a draw hook 2, the transition coupling of this invention is comprised of an eye-bar, element or link 3 having a hub or disc 4 at one end which is insertible in a slot 5 in and intermediate the vertical limits of a nose portion 6 of a knuckle 7 of the coupler and is adapted to be removably held therein by a connecting pin 8 removably seatable in aligned holes or apertures 9 and 10 in the knuckle 7 and hub 4, respectively.

Pivotable about the pin 8 horizontally relative to the knuckle 7, the eye-bar 3 has on the upper surface 11 of its hub 4 an upstanding, vertically directed or projecting shoulder or abutment 12 which conforms along its inner face 13 substantially to the confronting portion of the vertically extending face 14 of the nose 6 of the knuckle 7. The abutment 12 serves both to align the apertures 9 and 10 during assembly or ready insertion of the pin 8 and to prevent improper application of the transition coupling in an upside-down position. The other end of the eye bar 3 carries a horizontally directed or horizontal eye 15 which connects or interfits with a vertically directed eye 16 of a link 17, the latter forming part of a vertically pivotable or foldable linkage 18. As will be noted, both the eye-bar 3 and link 17 may have their eyes formed as a bight, in barstock with the ends brought together and forming their hubs, thus providing maximum strength in the connection under draft or tensile forces.

The other part of the linkage 18 is a clevis or link 19, the legs 20 of which straddle and are pivotally connected to the hub 21 of the link 17 by a headed pivot pin 22 extending through aligned openings 23 and 24 in the legs and hub, respectively, suitably held in place as by a cotter pin 25. The loop 26 of the clevis 19 is designed to be dropped over or applied to the vertically directed draw hook 2 and seat in the slot 27 therein.

Were the transition coupling limited to the above details, it would function effectively in draft. However, in buff or on a run-in between loosely-connected cars, the linkage 18 under certain conditions may pivot upwardly, in which case, if the run-in were sufficient, the loop 26 of the clevis 19 would be disengaged from the draw hook 2. To guard against such accidental disengagement, there is carried by the linkage 18 a safety lug 28 which projects radially from the pivot of the linkage toward the draw hook 2 and is disposed to engage the downwardly facing portion or lower quadrant 29 of the convexly arcuate or curved front or leading edge 30 of the draw hook. So disposed, the safety lug, under buffing forces sufficient otherwise to disengage the clevis 19 from the draw hook 2, will engage the downwardly facing portion 29 of the leading edge 30 of the draw hook and be wedged or guided downwardly, thereby carrying downwardly with it the pivot or the linkage 18 and, by forcing the likage to pivot or fold upwardly, prevent accidental disengagement of the draw hook.

In the illustrated embodiment, the safety lug 28 is formed integrally with the hub 21 of the link 17 and is somewhat triangular in side elevation, terminating or ending toward the draw hook 2 in a tip or apex 31 which, preferably, is rounded to minimize wear and avoid gouging of the front edge 30 of the draw hook. To be effective, the lug in buff must engage the downwardly facing portion or lower quadrant 29 of the leading edge 30 of the draw hook, that portion or quadrant being bounded at its upper outer extremity by a horizontal plane indicated at $x-x$ which passes through the point of outermost projection of the leading edge 30, the plane $x-x$ hereinafter being termed the horizontal midplane of the leading edge. As a consequence, the tip 31 of the illustrated lug 28 preferably projects or extends below this midplane to such an extent as to be engageable with the downwardly facing portion 29, both in the normal position shown in Figure 1 and in any upfolded position of the linkage 18, thus rendering the lug effective to force the linkage to pivot upwardly under the most aggravated conditions likely to be experienced in service. Additionally, to prevent the clevis from riding straight up off the draw hook, the horizontal spacing between the tip 31 of the lug and the confronting portion 29 of the leading edge 30 of the draw hook is less than that between the bight 32 and hooked end 33 of the draw hook 2.

So that the lug 28 will not interfere with flexing or folding of the linkage 18 to the extent needed to ensure that buffing forces will be taken through the associated buffers (not shown) rather than through the linkage, the upper surface 32 of the lug preferably is arcuately concave to accommodate the front edge 30 of the draw hook 2 during up-folding of the linkage. Additionally, to facilitate initial coupling, the lug 28 preferably is offset axially toward one side of the hub 21 to leave sufficient space in the opposite side of the loop 26 to accommodate the draw hook during initial coupling. While sufficient to enable the lug 28 to be guided or slid manually along a side of the draw hook during initial assembly, the offset in no wise interferes with the normal action of the lug in preventing accidental disengagement since even slight contact between the lug and the leading edge of the hook will cause the pivoted linkage to fold upwardly.

From the above detailed description, it will be apparent that there has been provided an improved transition coupling which, without requiring modification of a draw hook, is both simple and safe in operation. It should be understood that the described and disclosed embodiment is merely exemplary of the invention and that all modifications are intended to be included which do not depart from the spirit of the invention or the scope of the appended claims.

I claim:

1. The combination with a draw hook and an automatic knuckle type coupler, of a transition coupling releasably connectable to a knuckle of said coupler, said coupling including a linkage vertically pivotable about a pivot and having a link connectable to said draw hook, and lug means carried by and projecting radially from said pivot of said linkage, said lug means being disposed under buffing forces to engage a front edge of said draw hook below the vertical mid-point thereof and by forcing said linkage to pivot upwardly prevent accidental disengagement thereof from said draw hook.

2. The combination with a draw hook and an automatic knuckle type coupler, of a transition coupling releasably connectable to a knuckle of said coupler, said coupling including a linkage vertically pivotable about a pivot and having a link connectable to said draw hook, and means carried by and projecting radially from said pivot of said linkage, and means under buffing forces engaging a front edge of said draw hook below the vertical midpoint thereof and by forcing said linkage to pivot upwardly preventing accidental disengagement thereof from said draw hook.

3. The combination with a draw hook and an automatic knuckle type coupler, of a transition coupling releasably connectable to a knuckle of said coupler, said coupling including a linkage vertically pivotable about a pivot and having a link connectable to said draw hook, said linkage being vertically foldable, and lug means carried by and projecting from said pivot of said linkage and having a tip disposed in buff to engage a front edge of said hook below the vertical midpoint thereof for preventing accidental disengagement of said link from said draw hook.

4. The combination with a draw hook and an automatic knuckle type coupler, of a transition coupling comprising an element having one end releasably connectable for relative horizontal pivoting to a knuckle of said coupler, an eye in an opposite end of said element and connected to an eye of a link of a vertically pivotable linkage, said linkage including a second link pivotally connected to said first link and connectable to said draw hook, and means carried by said first link and projecting radially from the pivot thereof to said second link, said means being disposed to engage a front edge of said draw hook in buff below the vertical midpoint thereof and by forcing said linkage to pivot upwardly prevent accidental disengagement of said second link from said draw hook.

5. The combination with a draw hook and an automatic knuckle type coupler, of a transition coupling releasably connectable to a knuckle of said coupler, said coupling including a linkage vertically pivotable about a pivot and having a link connectable to said draw hook, and lug means carried by and projecting radially from said pivot of said linkage on application of said link to said hook, and said lug means being offset toward one side of said link sufficient for insertion of said draw hook therebetween and an opposite leg of said link.

6. The combination with a draw hook and an automatic knuckle type coupler, of a transition coupling comprising an eye-bar having at one end a hub fittable into a slot in a nose of a knuckle of said coupler and pin-connectable thereto through aligned apertures in said knuckle and hub for relative horizontal pivoting, means on and projecting vertically from said hub and conforming substantially in contour to a confronting vertically directed surface on a nose of said knuckle for aligning said apertures during connection of said eye-bar and knuckle, a horizontal eye in an opposite end of said eye-bar and connected to a vertical eye in one end of a link, a clevis having a loop fittable over said draw hook and legs straddling and pivotally connected to a hub of said link, said clevis and link together forming a vertically pivotable linkage, and lug means carried by said link hub and projecting therefrom toward said draw hook, said lug means being disposed to engage in buff a downwardly facing portion of a front edge of said draw hook and by forcing said linkage to pivot upwardly prevent accidental disengagement of said clevis from said draw hook.

7. The combination with a draw hook and an automatic knuckle type coupler, of a transition coupling comprising an eye-bar having at one end a hub fittable into a slot in a nose of a knuckle of said coupler and pin-connectable thereto through aligned apertures in said knuckle and hub for relative horizontal pivoting, a shoulder upstanding from said hub and having an inner face substantially conforming in contour to a confronting portion of a vertically directed surface on said nose of said knuckle, a horizontal eye in an opposite end of said eye-bar and connected to a vertical eye in one end of a link, a clevis having a loop fittable over said draw hook and legs straddling and pivotally connected to a hub of said link, said clevis and link together forming a vertically pivotable linkage, and lug means carried by said link hub and projecting therefrom toward said draw hook, said lug means being disposed in buff to engage a downwardly facing portion of a front edge of said draw hook and by forcing said linkage to pivot upwardly prevent accidental disengagement of said clevis from said draw hook.

No references cited.